(12) United States Patent  
Tecu et al.

(10) Patent No.: US 9,116,643 B2  
(45) Date of Patent: Aug. 25, 2015

(54) RETRIEVAL OF ELECTRONIC DOCUMENT USING HARDCOPY DOCUMENT

(71) Applicants: Kirk Steven Tecu, Longmont, CO (US); Mabry Frazier Dozier, III, Lafayette, CO (US)

(72) Inventors: Kirk Steven Tecu, Longmont, CO (US); Mabry Frazier Dozier, III, Lafayette, CO (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 78 days.

(21) Appl. No.: 13/781,138

(22) Filed: Feb. 28, 2013

(65) Prior Publication Data

US 2014/0240757 A1  Aug. 28, 2014

(51) Int. Cl.
| | |
|---|---|
| G06F 15/00 | (2006.01) |
| G06F 3/12 | (2006.01) |
| G06K 1/00 | (2006.01) |
| G06K 19/06 | (2006.01) |
| H04N 1/32 | (2006.01) |

(52) U.S. Cl.  
CPC ............ *G06F 3/1208* (2013.01); *G06F 3/1242* (2013.01); *G06F 3/1285* (2013.01); *G06K 19/06103* (2013.01); *H04N 1/32128* (2013.01)

(58) Field of Classification Search  
CPC ... G06F 3/1208; G06F 3/1242; G06F 3/1285; G06K 19/06103; H04N 1/32128  
USPC ........................ 358/1.1, 1.16, 1.15, 1.14, 1.13  
See application file for complete search history.

(56) References Cited

U.S. PATENT DOCUMENTS

2008/0266601 A1* 10/2008 Narukawa et al. ........... 358/1.15  
2012/0274970 A1* 11/2012 Cok .............................. 358/1.14

FOREIGN PATENT DOCUMENTS

| JP | 10283364 A | 10/1998 |
| JP | 2000276393 A | 10/2000 |
| JP | 2005014237 A | 1/2005 |

OTHER PUBLICATIONS

Concise Statement of Relevance for JP2005014237(A) published Jan. 20, 2005, 1 page.  
Concise Statement of Relevance for JP2000276393(A) published Oct. 6, 2000, 1 page.  
Concise Statement of Relevance for JP10-283364 published Oct. 23, 1998, 1 page.

* cited by examiner

*Primary Examiner* — Douglas Tran  
(74) *Attorney, Agent, or Firm* — Osha Liang LLP (57) ABSTRACT

A method for managing a first version and a second version of an electronic document (ED), including: obtaining a request to print the first version of the ED; generating, in response to the request, a print job based on the first version of the ED and identifying a storage location of the second version of the ED, of which at least a part of contents is different from the first version of the ED; and sending the print job to a printer to generate a hardcopy document (HD) based on the first version of the ED, where the HD includes a graphical element specifying the storage location of the second version of the ED, and where the second version of the ED is accessible to a reader of the HD by visiting the storage location specified in the graphical element of the HD.

20 Claims, 6 Drawing Sheets

RETRIEVAL OF ELECTRONIC DOCUMENT USING HARDCOPY DOCUMENT

BACKGROUND

Hardcopy documents are frequently distributed at presentations, tradeshows, training classes, etc. However, the recipients of these hardcopy documents may come from a wide variety of language backgrounds and thus distributing a hardcopy document in a single language may not effectively convey information to all of the recipients. Further, the costs and/or technical limitations associated with hardcopy documents may require figures to be omitted and/or font sizes to be reduced. Further still, in an increasingly digital world, recipients often misplace hardcopy documents. Regardless, authors still want to distribute hardcopy documents.

SUMMARY

In general, in one aspect, the invention relates to a method for printing an electronic document (ED). The method comprises: obtaining, by a printer, a print job to print a first version of the ED; generating, by the printer, a graphical element specifying a storage location associated with a second version of the ED, of which at least a part of contents is different from the first version of the ED; and generating, by the printer and in response to the print job, a hardcopy document (HD) based on the first version of the ED and comprising the graphical element, wherein the second version of the ED is accessible to a reader of the HD by visiting the storage location specified in the graphical element of the HD.

In general, in one aspect, the invention relates to a method for managing a first version and as second version of an electronic document (ED). The method comprises: obtaining a request to print the first version of the ED; generating, by a computer processor and in response to the request, a print job based on the first version of the ED and identifying a storage location of the second version of the ED, of which at least a part of contents is different from the first version of the ED; and sending the print job to a printer to generate a hardcopy document (HD) based on the first version of the ED, wherein the HD comprises a graphical element specifying the storage location of the second version of the ED, and wherein the second version of the ED is accessible to a reader of the HD by visiting the storage location specified in the graphical element of the HD.

In general, in one aspect, the invention relates to a non-transitory computer readable medium (CRM) storing a plurality of instructions for managing a first version and a second version of an electronic document (ED). The instructions comprise functionality for: obtaining a request to print the first version of the ED; generating, in response to the request, a print job based on the first version of the ED and identifying a storage location of the second version of the ED, of which at least a part of contents is different from the first version of the ED; and sending the print job to a printer to generate a hardcopy document (HD) based on the first version of the ED, wherein the HD comprises a graphical element specifying the storage location of the second version of the ED, and wherein the second version of the ED is accessible to a reader of the HD by visiting the storage location specified in the graphical element of the HD.

In general, in one aspect, the invention relates to a system for managing a first version and a second version of an electronic document (ED). The system comprises: a computing device configured to generate a print job based on the first version of the ED in response to a print request; a repository operatively connected to the computing device and comprising a storage location associated with the second version of the ED, of which at least a part of contents is different from the first version of the ED; and a printer operatively connected to the computing device and the repository and configured to: generate, in response to the print job, a graphical element specifying the storage location associated with the second version of the ED; and generate, in response to the print job and based on the first version of the ED, a hardcopy document (HD) comprising the graphical element.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for printing an electronic document (ED). In response to a print job, a printer may generate a graphical element (e.g., 1-D barcode, 2-D barcode, code, data glyph, plaintext, etc.) specifying a storage location (e.g., URL) associated with the ED. The hardcopy document (HD) generated by the printer may include the graphical element specifying the storage location. A reader of the HD may retrieve the ED by accessing the storage location specified in the graphical element.

In general, embodiments of the invention provide a system and method for managing multiple versions of an electronic document. The multiple versions may differ in languages, font sizes, file formats, number of images, resolutions, colors, etc. A print job for a first version of the ED may be received by a printer. In response to the print job for the first version, the printer may generate a graphical element (e.g., 1-D barcode, 2-D barcode, data glyph, text, etc.) specifying a storage location (e.g., URL) associated with a second version of the ED. The HD generated by the printer may include the graphical element specifying the storage location. A reader of the HD may retrieve the second version of the ED by accessing the storage location specified in the graphical element.

Figure 1:
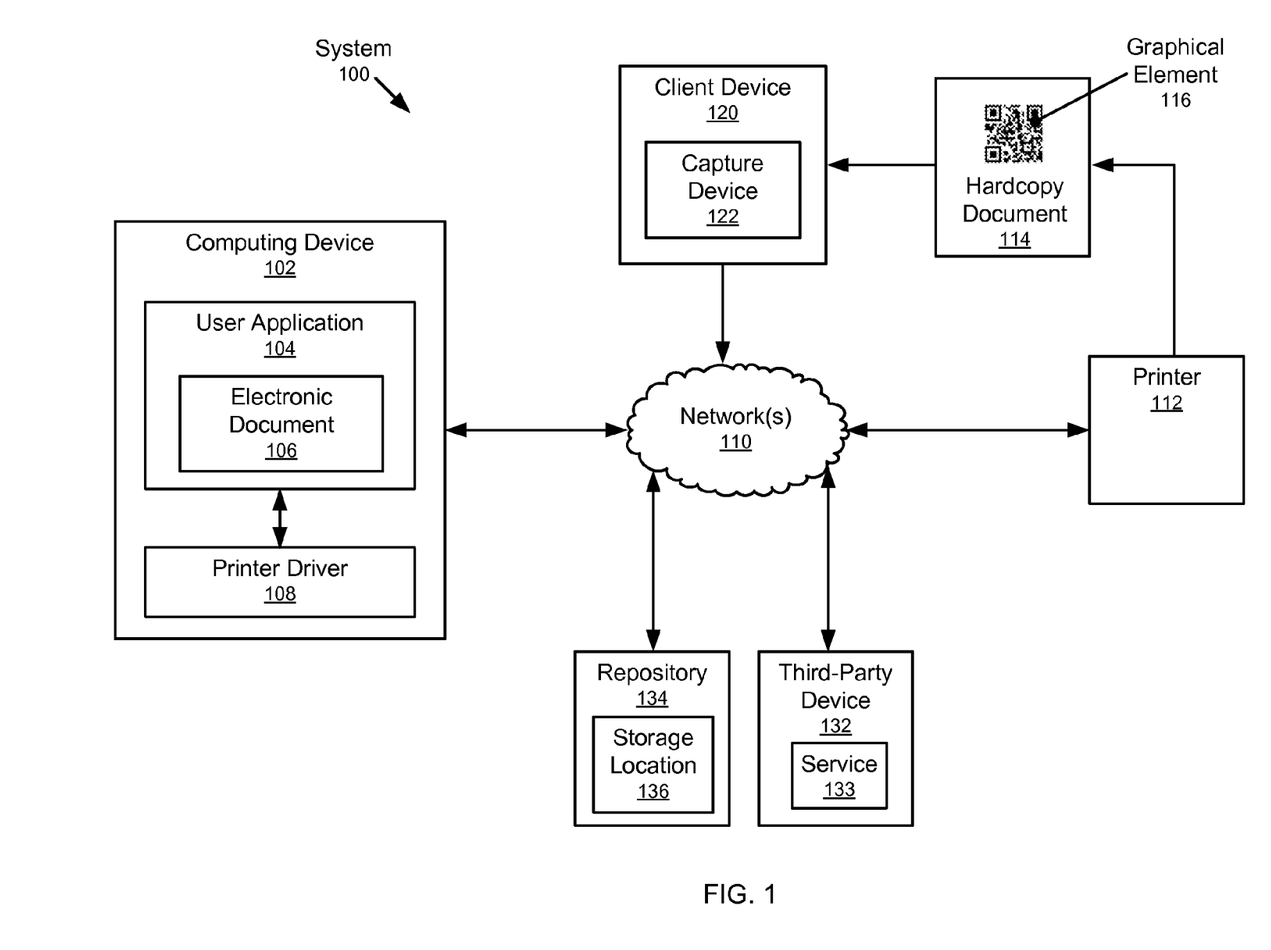
FIG. 1 shows a system in accordance with one or more embodiments of the invention.

FIG. 1 shows a system (100) in accordance with one or more embodiments of the invention. As shown in FIG. 1, the system (100) has multiple components including a computing device (102), a printer (112), a client device (120), a repository (134), and a third-party device (132). Each of the computing device (102), the client device (120), and the third-party device (132) may be a personal computer (PC), a desktop computer, a mainframe, a server, a telephone, a kiosk, a cable box, a personal digital assistant (PDA), an electronic reader, a mobile phone, a smart phone, a tablet computer, etc. As shown in FIG. 1, the computing device (102), the printer (112), the client device (120), the repository (134), and the third-party device (132) may be connected using one or more networks (110) of any size, having wired and/or wireless segments.

In one or more embodiments of the invention, the computing device (102) executes the user application (104). The user application (104) is a software application operated by a user and configured to obtain, input, generate, display, and/or print an ED (e.g., Electronic Document (106)). Accordingly, the user application (104) may be a word-processing application, a spreadsheet application, a desktop publishing application, a graphics application, a photograph printing application, an Internet browser, a slide show generating application, a form, etc. The user application (104) may generate new EDs and/or obtain previously saved EDs.

In one or more embodiments of the invention, the ED (106) includes text characters, images, graphics, animation sequences, video clips, audio clips, etc. to be displayed on or across one or more pages or slides. In one or more embodiments of the invention, the ED (106) is represented/defined using a document markup language (e.g., open document format (ODF), office open XML (OOXML), etc.). Accordingly, the text characters, images, graphics, fonts, animation sequences, video clips, audio clips, etc. in the ED (106) may be recorded/identified as attributes within the tags of the document markup language. Those skilled in the art, having the benefit of this detailed description, will appreciate that many different file formats exist and that the ED (106) may be saved in any of the various file formats.

As discussed above, multiple versions of the ED (106) may exist and/or be generated. For example, one version may be written in English while another version may be written in Japanese. As another example, one version may have multiple colors while another version may be grayscale. As another example, one version may have all the figures, while another version may omit some or all of the figures. As another example, one version may have a 10 pt font size while another version may have a 14 pt font size. As yet another example, one version may be saved in OOXML format while another version may be saved in PDF format.

In one or more embodiments of the invention, the computing device (102) executes the printer driver (108). The printer driver (108) may be invoked within the user application (104) when the user wishes to print the ED (106). The printer driver (108) may include one or more graphical user interfaces (GUIs) with one or more GUI widgets (e.g., checkboxes, radio buttons, buttons, drop-down lists, etc.) to collect input from the user. In one or more embodiments of the invention, the user manipulates the GUI widgets to create one or more versions of the ED (106) and specify which version(s) should be printed and which version(s) should not be printed but rather stored for future retrieval. In other words, the GUIs are used to collect parameters from the user and these parameters may be used to generate multiple versions of the ED (106). One or more of the versions may be generated by the computing device (102). Moreover, the printer driver (108) is configured to generate a print job for one of the versions. The print job may also specify the parameters of one or more of the other versions (discussed below).

In one or more embodiments of the invention, the system (100) includes the repository (134). The repository (134) may be a database or any type of storage array. The repository (134) may be accessed through a web server (not shown). In one or more embodiments of the invention, the repository (134) stores one or more versions of the ED (106) after they are generated. The repository (134) may also store web pages/sites to access one or more versions of the ED (106). In other words, the repository (134) includes multiple storage locations (e.g., storage location (136)) and the storage locations may store versions of the ED (106) and/or web pages/sites for accessing the versions of the ED (106). In one or more embodiments of the invention, the print jobs created by the printer driver (108) may specify the storage locations associated with one or more version of the ED (106).

In one or more embodiments of the invention, the third-party device (132) includes a third-party service (133). The third-party service (133) may be invoked (e.g., by the printer driver (108) or the printer (112)) to generate a version of the ED (106). For example, the third-party service (133) may be a translation service to generate a Japanese version of the ED (106). The third-party service (133) may also generate a PDF or OOXML version of the ED (106). The third-party service (133) may store the generated versions of the ED (106) in the repository and return the storage location to the printer driver (108) and/or the printer (112).

In one or more embodiments of the invention, the system (100) includes the printer (112). As discussed above, the printer (112) may be a stand alone printer or a multifunction printer. In one or more embodiments of the invention, the printer (112) is configured to receive a print job to print the ED or a version of the ED. The printer (112) generates a HD (114) based on the print job.

In one or more embodiments of the invention, the print job includes the storage location(s) associated with the ED or one or more versions of the ED. Such information may be included in a print ticket associated with the print job. The printer (112) may further be configured to generate one or more graphical elements (e.g., 1-D barcode, 2-D barcode, data glyph, plaintext, etc.) (116) specifying the storage location(s) of the ED (106) or one or more versions of the ED (106). The printer (112) may also generate a plaintext label for each of the graphical elements. The one or more graphical elements and the plaintext labels may be included in the HD (114). For example, as shown in FIG. 1, the HD (114) includes the graphical element (116). The graphical element (116) may be placed on any page of the HD (114). Moreover, an extra page (i.e., a retrieval page) may be added to the HD (114) and have solely the graphical element(s) (116) and the plaintext label(s).

In one or more embodiments of the invention, the printer (112) is configured to generate one or more versions of the ED (106) based on the parameters specified in the print job. The printer (112) itself may generate one or more versions of the ED (106) based on the parameters and then store the versions (e.g., in the repository (134)). The printer (112) may invoke the third-party service (133) to generate one or more versions of the ED (106) based on the parameters.

In one or more embodiments of the invention, the client device (120) is operated by a reader (i.e., person/individual) of the HD (114). The client device (120) may include a capture device (122) configured to identify the storage location(s) specified in the graphical element(s) of the HD (114). The capture device (122) may be any combination of hardware and software. For example, the capture device (122) may be a camera configured to photograph the graphical element (116) of the HD (114) and then extract the identity of the storage location from the image. As another example, the capture device (122) may be a laser to read the graphical element (116) when the graphical element (116) is a 2-D barcode or 1-D barcode.

In one or more embodiments of the invention, once the storage location(s) have been identified from the one or more graphical elements (116) in the HD (114), the client device (120) is configured to access the storage location(s) to retrieve/download the one or more versions of the ED (106). As discussed above, the storage locations may be web pages/sites. Accordingly, the client device (120) may include a web browser to access the identified web page/site associated with the versions of the ED (106).

Figure 2:
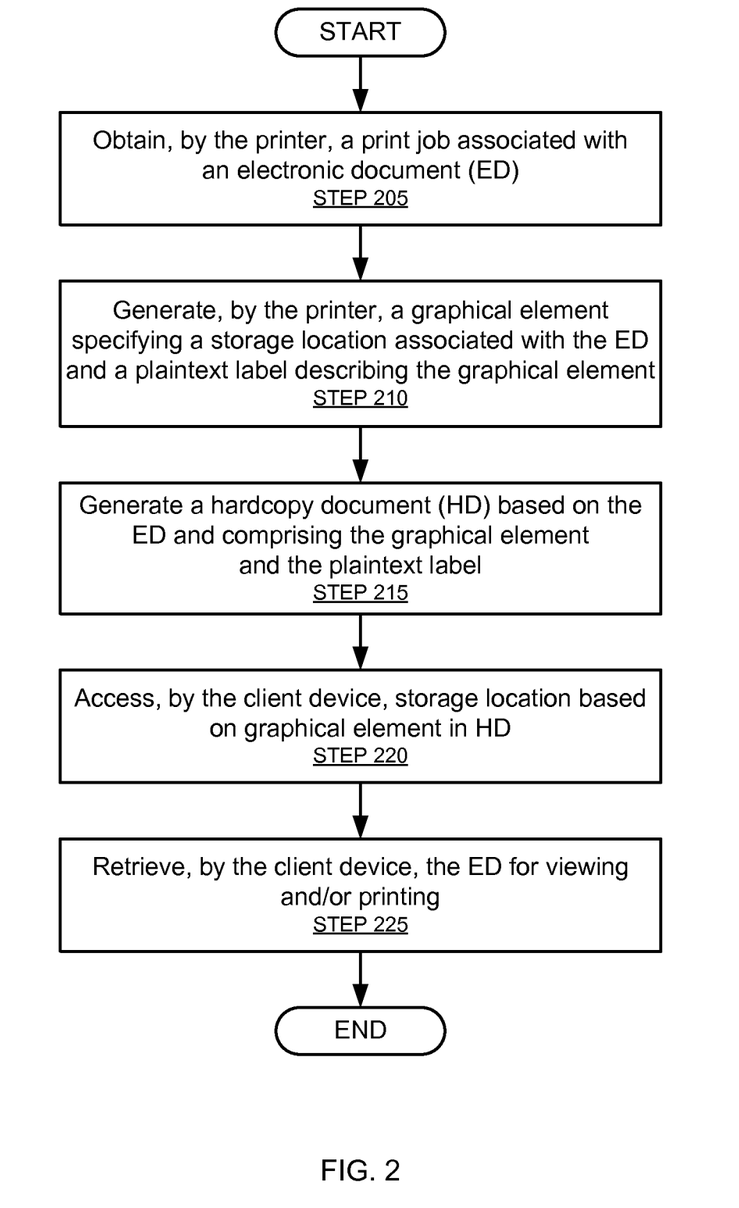
FIG. 2, FIG. 3, and FIG. 4 show flowcharts in accordance with one or more embodiments of the invention.

FIG. 2 shows a flowchart in accordance with one or more embodiments of the invention. The process shown in FIG. 2 may be executed, for example, by one or more components (e.g., printer (112), client device (120)) discussed above in reference to FIG. 1. One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

Initially, a print job associated with an ED is obtained by a printer (STEP 205). The print job was generated in response to a request to print the ED. The print job may identify the storage location where the ED will be available for download. The ED may already be stored at this location. Alternatively, the printer will store the ED at this location. In one or more embodiments of the invention, the storage location is not specified in the print job and the printer specifies the storage location according to some predetermined algorithm involving the name of the ED and/or the time/date stamp associated with the print job.

In STEP 210, the printer generates a graphical element specifying the storage location associated with the ED. The graphical element may be a 1-D barcode, a 2-D barcode, a data glyph, a plaintext URL, etc. The printer may also generate a plaintext label describing the graphical element.

In STEP 215, the printer generates a HD based on the ED. The HD includes the graphical element and the plaintext label. The graphical element may be placed on any page in the HD (e.g., cover page, final page, etc.). In one or more embodiments of the invention, the printer creates an extra page or retrieval page for the HD. The extra page or retrieval page has solely the graphical element and the plaintext label.

The HD may be read by one or more individuals. Moreover, at least one individual may wish to access the ED corresponding to the HD. In STEP 220, the reader of the HD uses his/her client device to access the storage location based on the graphical element in the HD. For example, the client device may include a barcode reader to read the graphical element and obtain the storage location. The storage location may be a website and the client device may include a web browser to access the website.

In STEP 225, the ED is downloaded onto the client device for viewing, saving, and/or printing by the operator of the client device.

Figure 3:
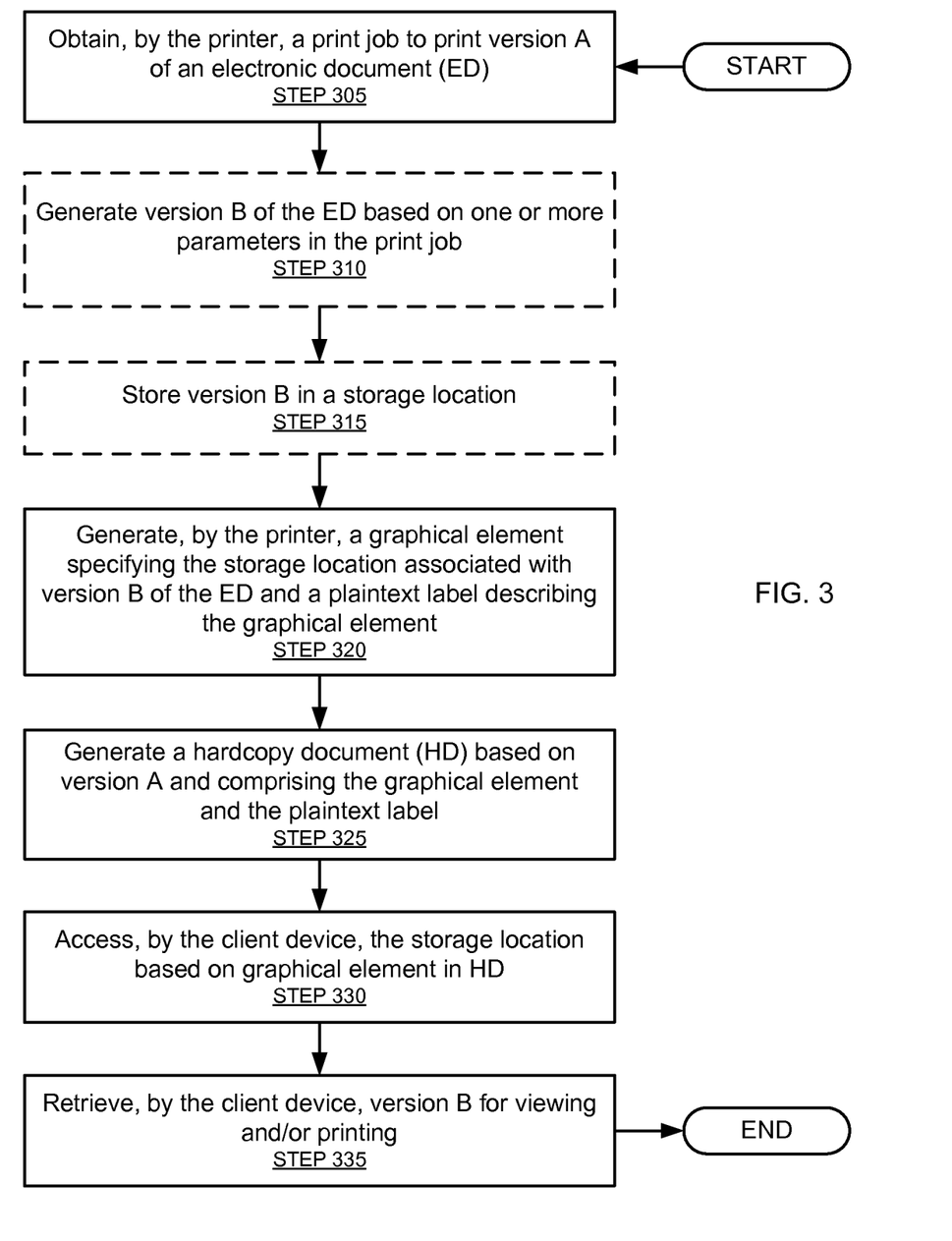

FIG. 3 shows a flowchart in accordance with one or more embodiments of the invention. The process shown in FIG. 3 may be executed, for example, by one or more components (e.g., printer (112), client device (120)) discussed above in reference to FIG. 1. One or more steps shown in FIG. 3 may be omitted, repeated, and/or performed in a different order among different embodiments of the invention. Accordingly, embodiments of the invention should not be considered limited to the specific number and arrangement of steps shown in FIG. 3.

Initially, a print job is obtained by a printer (STEP 305). The print job may correspond to a request to print version A of an ED. The print job may identify the storage location where version B of the ED will be available for download. Version A and version B of the ED may differ in languages, number of images, colors, font sizes, etc. Version B of the ED may already be generated and stored at this location. Alternatively, the printer will store version B of the ED at this location. In one or more embodiments of the invention, the storage location is not specified in the print job and the printer specifies the storage location according to some predetermined algorithm involving the name of the ED and/or the time/date stamp associated with the print job. In one or more embodiments of the invention, the print job includes one or more parameters defining version B and/or version A.

In STEP 310, the printer generates version B of the ED based on one or more parameters specified in the print job. These parameters may have been specified by using the GUI (s) of the printer driver. In one or more embodiments of the invention, the printer itself generated version B and/or version A of the ED. In one or more embodiments of the invention, the printer relies on a third-party service to generate version B and/or version A of the ED. Version B may be generated from version A. Alternatively, version A may be generated from version B. Those skilled in the art, having the benefit of this detailed description, will appreciate that STEP 310 may be omitted if version B of the ED has already been generated (i.e., prior to receiving the print job).

In STEP 315, version B of the ED is stored in a storage location. In one or more embodiments of the invention, the printer itself stores version B at the storage location. In one or more embodiments of the invention, the third-party service that generated version B stores it in a storage location. The identity of the storage location may be returned to the printer. Those skilled in the art, having the benefit of this detailed description, will appreciate that STEP 315 may be omitted if version B is already stored at the storage location (i.e., prior to receiving the print job).

In STEP 320, the printer generates a graphical element specifying the storage location associated with version B of the ED. The graphical element may be a 1-D barcode, a 2-D barcode, a data glyph, a plaintext URL, etc. The printer may also generate a plaintext label describing the graphical element.

In STEP 325, the printer generates a HD based on version A of the ED. The HD includes the graphical element and the plaintext label. The graphical element may be placed on any page in the HD (e.g., cover page, final page, etc.). In one or more embodiments of the invention, the printer creates an extra page or retrieval page for the HD. The extra page or retrieval page has solely the graphical element and the plaintext label.

The HD may be read by one or more individuals. Moreover, at least one individual may wish to access version B of the ED. In STEP 330, a reader of the HD uses his/her client device to access the storage location based on the graphical element in the HD. For example, the client device may include a barcode reader to read the graphical element and obtain the storage location. The storage location may be a website and the client device may include a web browser to access the website.

In STEP 335, version B of ED is downloaded onto the client device for viewing, saving, and/or printing by the operator of the client device.

Those skilled in the art, having the benefit of this detailed description, will appreciate that one or more steps in FIG. 3 may be repeated to create any number of versions of the ED.

Accordingly, the generated HD may have multiple graphical element(s) specifying the storage location(s) of the numerous versions.

Figure 4:
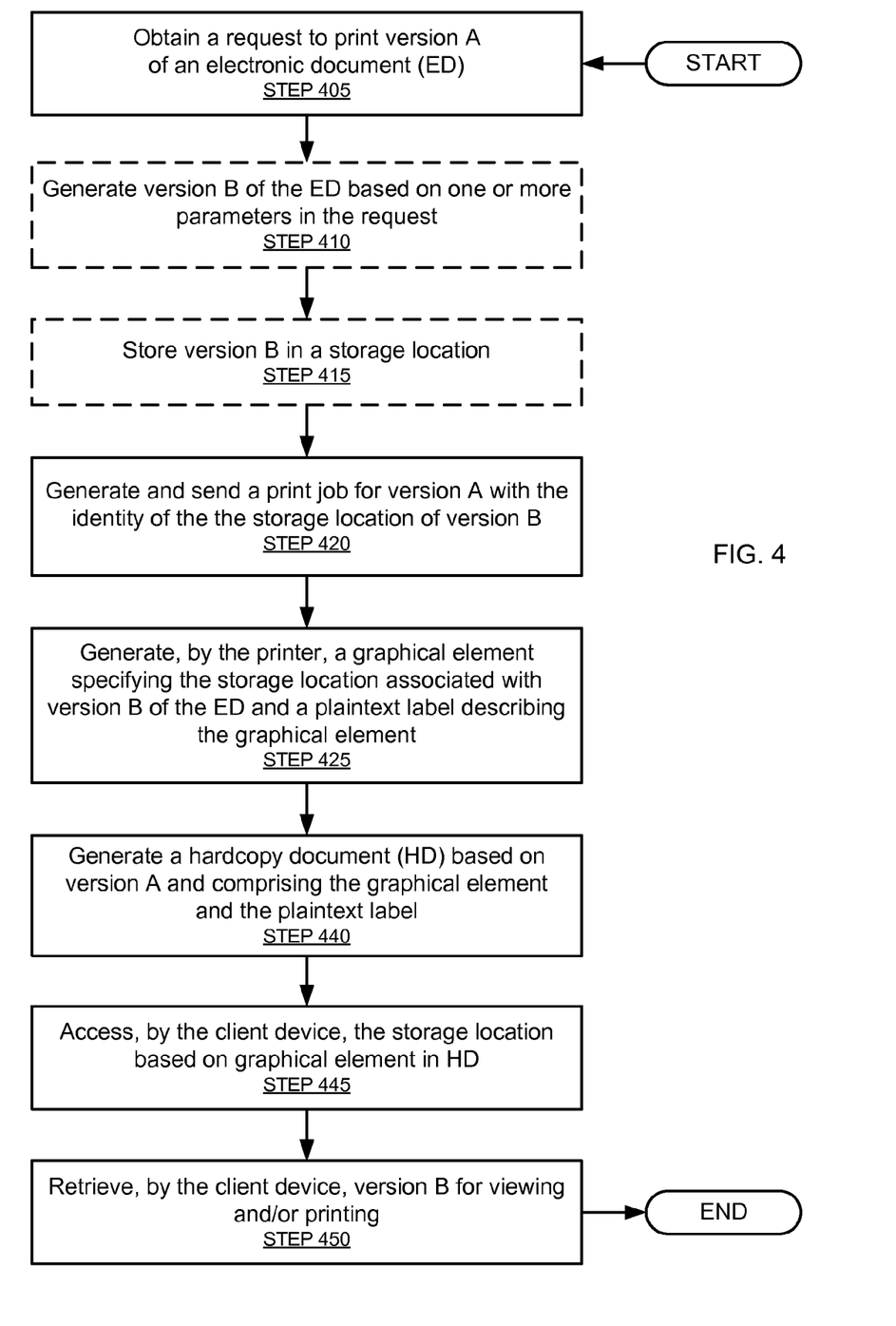

FIG. 4 shows a flowchart in accordance with one or more embodiments of the invention. The process shown in FIG. 4 may be executed, for example, by one or more components (e.g., printer (112), client device (120), computing device (102)) discussed above in reference to FIG. 1. One or more steps shown in FIG. 3 may be omitted, repeated, and/or performed in a different order among different embodiments of the invention. Accordingly, embodiments of the invention should not be considered limited to the specific number and arrangement of steps shown in FIG. 4.

Initially, a request to print version A of an ED is obtained (STEP 405). The request may include one or more parameters defining version A. The request may also include one or more parameters defining version B. The request may also specify that the HD generated from version A include a graphical element specifying a storage location of version B of the ED. The parameters may be specified by a user and collected using one or more GUIs of a printer driver. Version A and version B may differ with respect to language, number of images, font sizes, resolution, file formats, etc.

In STEP 410, version B of the ED is generated based on the one or more parameters specified in the request. In one or more embodiments of the invention, the printer driver itself may generate version B of the ED. In one or more embodiments of the invention, the printer driver may invoke a third-party service to generate version B of the ED. Version B may be generated from version A. Alternatively, version A may be generated from version B. Those skilled in the art, having the benefit of this detailed description, will appreciate that STEP 410 may be omitted if responsibility for generating version B is given to the printer.

In STEP 415, version B of the ED is stored in a storage location. In one or more embodiments of the invention, the printer driver stores version B at the storage location. In one or more embodiments of the invention, the third-party service that generated version B stores it in a storage location. The identity of the storage location may be returned to the printer driver. Those skilled in the art, having the benefit of this detailed description, will appreciate that STEP 415 may be omitted if responsibility for generating version B is given to the printer.

In STEP 420, a print job for version A is generated by the printer driver. The print job may specify that the resulting hardcopy document require a graphical element specifying a storage location of version B of the ED. The print job may also include one or more parameters for generating version A and/or version B of the ED.

In STEP 425, the printer generates a graphical element specifying the storage location associated with version B of the ED. The graphical element may be a 1-D barcode, a 2-D barcode, a data glyph, a plaintext URL, etc. The printer may also generate a plaintext label describing the graphical element.

In STEP 440, the printer generates a HD based on version A of the ED. The HD includes the graphical element and the plaintext label. The graphical element may be placed on any page in the HD (e.g., cover page, final page, etc.). In one or more embodiments of the invention, the printer creates an extra page or retrieval page for the HD. The extra page or retrieval page has solely the graphical element and the plaintext label.

The HD may be read by one or more individuals. Moreover, at least one individual may wish to access version B of the ED. In STEP 445, a reader of the HD uses his/her client device to access the storage location based on the graphical element in the HD. For example, the client device may include a barcode code reader to read the graphical element and obtain the storage location. The storage location may be a website and the client device may include a web browser to access the website.

In STEP 450, version B of the ED is downloaded onto the client device for viewing, saving, and/or printing by the operator of the client device.

Those skilled in the art, having the benefit of this detailed description, will appreciate that one or more steps in FIG. 4 may be repeated to create any number of versions of the ED. Accordingly, the generated HD may have multiple graphical element(s) specifying the storage location(s) of the numerous versions.

Figure 5:
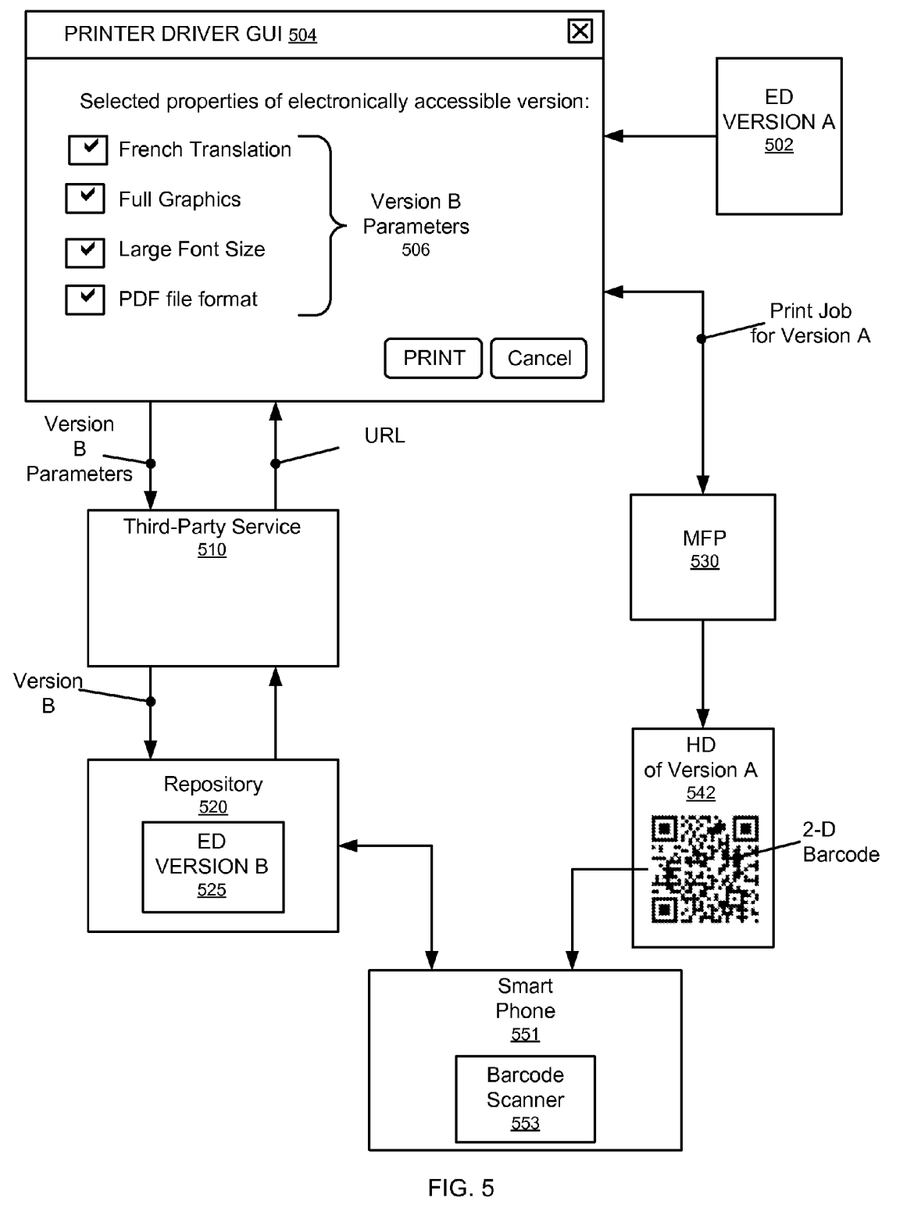
FIG. 5 shows an example in accordance with one or more embodiments of the invention.

FIG. 5 shows an example in accordance with one or more embodiments of the invention. For the example, assume a user wishes to generate a HD (542) corresponding to version A of an ED (502). However, the user also wishes to create version B of the ED (525) and make version B (525) accessible to the readers of the HD (542).

Within the printer driver GUI (504), the user can select/set the parameters (506) of version B. As shown by the selected parameters (506), the user wishes version B to be a French translation of version A (502) (i.e., version A (502) is written in some language other than French); the user wishes version B to have all of the graphics of the ED (i.e., version A (502) may have zero or only a select few of the graphics of the ED); the user wishes version B to have a larger font size than version A; and the user wishes version B to be saved/stored in the PDF file format (i.e., version A (502) may be in the OOXML format).

Still referring to FIG. 5, the printer driver forwards the version B parameters (506) to a third-party service (510). The third-party service (510) will generate version B of the ED (525) according to the parameters (506) and store version B of the ED (525) in a storage location in the repository (520). The storage location (i.e., URL) will be included in a reply to the printer driver.

Once version B of the ED (525) has been stored, the printer driver generates a print job for version A. The print job also includes the storage location associated with version B of the ED (525). The existence of version B (525) and the storage location may be specified in the print ticket associated with the print job. The print job is forwarded to a multifunction printer (MFP) (530). The MFP (530) generates a 2-D barcode specifying the storage location and then generates the HD (542) based on version A of the ED (502). The HD (542) includes the 2-D barcode.

The smart phone (551) includes a barcode scanner (553) and is operated by a reader of the HD (542). The reader of the HD (542) scans the 2-D barcode using the barcode scanner (553) to obtain the storage location associated with version B of the ED (525). The smart phone (551) can then access the storage location via the Internet and download version B of the ED (525).

The following are additional examples for use of the system (100) and/or any process described in the flowcharts of FIG. 2, FIG. 3, and FIG. 4.

A US business traveler has created a presentation that he is presenting to a potential Japanese client. The document is in English. He wishes to provide a method for the client to retrieve a translated document to their native Japanese language in the event that they do not understand English.

A US business traveler has created a presentation that he is presenting to a potential client. He will provide hard copy documents, however, to save money, his company provides only a monochrome printer. He creates the document in full color, and prints his handouts in monochrome. By selecting the appropriate parameters, his audience can download the full color version of the document either during the presentation, or afterward using the provided URL on the automatically generated retrieval page.

A teacher has created lesson material in a presentation that he is presenting to a class. The topic is highly technical and he has limited time to present the lesson. He will provide hard copy documents with an abbreviated description, however, to aid his students to understand more, he has provided an alternate version of the presentation with figures and pictures in electronic form. By selecting the appropriate option, his audience can download the full detailed electronic version of the document either during the presentation, or afterward using the provided URL on the automatically generated retrieval page.

A hospital provides medical information for patients that are checking out. This information includes discharge instructions as well as prescription information for the medications they will be taking. To conserve paper and cost, this document uses smaller fonts to allow the information to be contained in a minimal number of pages. This use of small type fonts can be difficult for persons with poor vision to read easily. An alternative version, that is automatically re-formatted with larger text during the printing process, is stored and is accessible via the URL or 2-D barcode.

Figure 6:
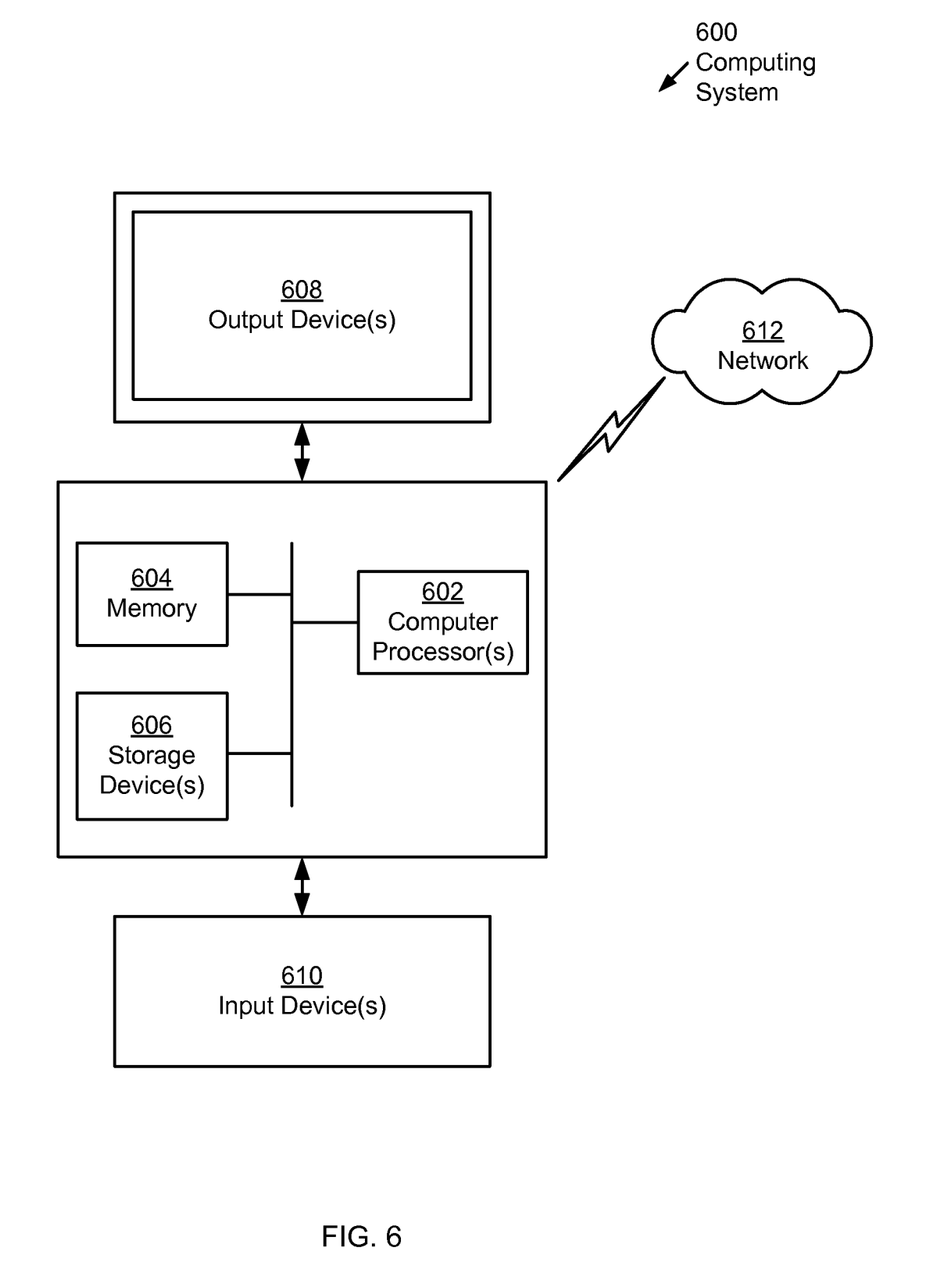
FIG. 6 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (612). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for printing an electronic document (ED), comprising:
   obtaining, by a printer, a print job to print a first version of the ED;
   generating, by the printer, a graphical element specifying a storage location associated with a second version of the ED, of which at least a part of contents is different from the first version of the ED; and
   generating, by the printer and in response to obtaining the print job, a hardcopy document (HD) based on the first version of the ED and comprising the graphical element, wherein the second version of the ED is accessible to a reader of the HD by visiting the storage location specified in the graphical element of the HD.

2. The method of claim 1, further comprising:
   generating, by the printer, the second version of the electronic document based on a plurality of parameters in the print job; and
   storing the second version of the ED at the storage location.

3. The method of claim 1, further comprising:
   generating, by the printer, a plaintext label describing the graphical element based on the print job,
   wherein the HD comprises the plaintext label, and
   wherein the graphical element is one selected from a group consisting of a 2-D barcode and a data glyph.

4. The method of claim 1, wherein the first version of the ED and the second version of the ED are written in different languages.

5. The method of claim 1, wherein the second version of the ED comprises a plurality of images, and wherein the first version of the ED and the HD do not include the plurality of images.

6. A method for managing a first version and a second version of an electronic document (ED), comprising:
   obtaining a request to print the first version of the ED;

generating, by a computer processor and in response to obtaining the request, a print job based on the first version of the ED and identifying a storage location of the second version of the ED, of which at least a part of contents is different from the first version of the ED; and sending the print job to a printer to generate a hardcopy document (HD) based on the first version of the ED, wherein the HD comprises a graphical element specifying the storage location of the second version of the ED, and wherein the second version of the ED is accessible to a reader of the HD by visiting the storage location specified in the graphical element of the HD.

7. The method of claim 6, further comprising:

sending, in response to obtaining the request, the first version of the ED and a plurality of parameters from the request to a third-party service, wherein the third-party service generates the second version of the ED based on the plurality of parameters and stores the second version of the ED in the storage location; and obtaining, in response to sending the first version of the ED, a reply from the third-party service identifying the storage location.

8. The method of claim 6, further comprising:

generating, by the computer processor, the second version of the ED based on a plurality of parameters in the print job specified by a user; and storing the second version of the ED at the storage location.

9. The method of claim 6, wherein the graphical element is one selected from a group consisting of a 2-D barcode and a data glyph.

10. The method of claim 6, wherein the first version of the ED and the second version of the ED are written in different languages.

11. The method of claim 6, wherein the first version and the second version of the ED are in different file formats.

12. A non-transitory computer readable medium (CRM) storing a plurality of instructions for managing a first version and a second version of an electronic document (ED), the instructions comprising functionality for:

obtaining a request to print the first version of the ED;

generating, in response to obtaining the request, a print job based on the first version of the ED and identifying a storage location of the second version of the ED, of which at least a part of contents is different from the first version of the ED; and sending the print job to a printer to generate a hardcopy document (HD) based on the first version of the ED, wherein the HD comprises a graphical element specifying the storage location of the second version of the ED, and wherein the second version of the ED is accessible to a reader of the HD by visiting the storage location specified in the graphical element of the HD.

13. The non-transitory CRM of claim 12, the instructions further comprising functionality for:

generating the second version of the ED based on a plurality of parameters in the print job specified by a user; and storing the second version of the ED at the storage location, wherein the graphical element is one selected from a group consisting of a 2-D barcode and a data glyph.

14. The non-transitory CRM of 12, wherein the first version of the ED and the second version of the ED are written in different languages.

15. The non-transitory CRM of claim 12, wherein the first version and the second version of the ED are in different file formats.

16. The non-transitory CRM of claim 12, wherein the second version of the ED comprises a plurality of images, and wherein the first version of the ED and the HD do not include the plurality of images.

17. A system for managing a first version and a second version of an electronic document (ED), comprising:

a computing device configured to generate a print job based on the first version of the ED in response to a print request;

a repository operatively connected to the computing device and comprising a storage location associated with the second version of the ED, of which at least a part of contents is different from the first version of the ED; and a printer operatively connected to the computing device and the repository and configured to:

generate a graphical element specifying the storage location associated with the second version of the ED; and generate a hardcopy document (HD) comprising the graphical element.

18. The system of claim 17, further comprising:

a third-party service configured to:

generate the second version of the ED based on a plurality of parameters specified in the print request; and store the second version of the ED in the repository at the storage location.

19. The system of claim 17, further comprising:

a client device operated by a reader of the HD and configured to:

obtain the storage location by scanning the graphical element on the HD; and retrieve the second version of the ED by accessing the storage location on the repository, wherein the graphical element is one selected from a group consisting of a 2-D barcode and a data glyph.

20. The system of claim 17, wherein the first version of the ED and the second version of the ED are written in different languages.

* * * * *